United States Patent
Lee et al.

(10) Patent No.: US 7,364,287 B2
(45) Date of Patent: Apr. 29, 2008

(54) PIVOTALLY OPENABLE TYPE SPECTACLES AND SUNSHADE-CLIP ASSEMBLY

(76) Inventors: Suk-Jae Lee, 850, Chimsan1-Dong, Buk-Gu, Daegu (KR); Ju-Jae Lee, 101-701 Daewoo Royal Heights, 1190 Jisan-Dong, Susung-Gu, Daegu (KR); Hyun-Jun Lee, 850 Chimsan1-Dong, Buk-Gu, Daegu (KR); Sung-Jun Lee, 101-701 Daewoo Royal Heights, 1190 Jisan-Dong, Susung-Gu, Daegu (KR)

( * ) Notice: Subject to any disclaimer, the term of this patent is extended or adjusted under 35 U.S.C. 154(b) by 261 days.

(21) Appl. No.: 11/343,474

(22) Filed: Jan. 31, 2006

(65) Prior Publication Data
US 2007/0177098 A1    Aug. 2, 2007

(51) Int. Cl.
*G02C 9/00* (2006.01)
(52) U.S. Cl. .......................................... 351/47; 351/57
(58) Field of Classification Search ................. 351/41, 351/44, 47, 48, 57, 58
See application file for complete search history.

(56) References Cited

U.S. PATENT DOCUMENTS

| | | | | |
|---|---|---|---|---|
| 6,053,611 A | * | 4/2000 | Ku | 351/47 |
| 7,040,749 B2 | * | 5/2006 | Smith | 351/47 |
| 2006/0098158 A1 | * | 5/2006 | Lee | 351/47 |

* cited by examiner

*Primary Examiner*—Huy K Mai
(74) *Attorney, Agent, or Firm*—St. Onge Steward Johnston & Reens LLC

(57) ABSTRACT

Disclosed herein is a pivotally openable spectacles and sunshade-clip assembly in which a sunshade-clip is pivotally rotatable about a pair of hinge arm units thereof after being attached to spectacles by use of corresponding spectacles magnets and clip magnets. The spectacles include a pair of lens frames, a pair of temple arms, a pair of hinge units each used to hingedly connect one of the lens frames to one of the temple arms. The spectacles magnets are mounted in the hinge units. The sunshade-clip includes a pair of colored clip lenses, a pair of clip lens frames, a pair of hinge arm units, and the clip magnets mounted to the hinge arm units, respectively, to correspond to the spectacles magnets.

14 Claims, 18 Drawing Sheets

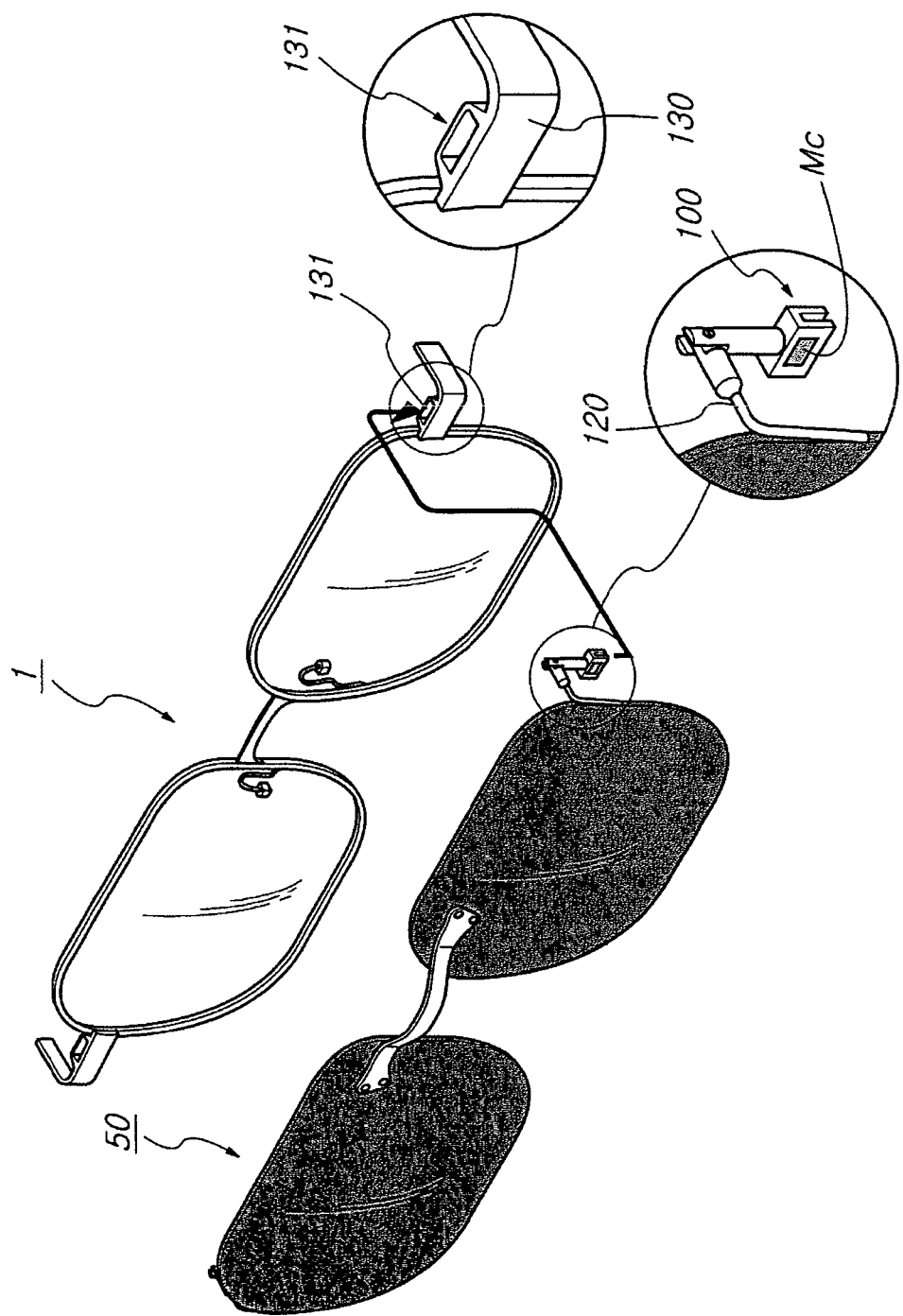

PIVOTALLY OPENABLE TYPE SPECTACLES AND SUNSHADE-CLIP ASSEMBLY

FIELD OF THE INVENTION

The present invention relates to a pivotally openable type spectacles and sunshade-clip assembly, and, more particularly, to an improved structure for detachably attaching a sunshade-clip to spectacles by use of magnets, thereby allowing the sunshade-clip to be pivotally rotated to be opened away from the spectacles.

BACKGROUND OF THE INVENTION

In conjunction with spectacles having a pair of prescription lenses and a sunshade-clip having a pair of colored clip lenses corresponding to the spectacles, a structure to detachably attach the sunshade-clip to the spectacles by use of a plurality of corresponding spectacles and clip magnets can be considered. In addition to the attachment object, an inventor of the present invention aims to improve the structure to allow the sunshade-clip to be pivotally rotated upward, thereby being opened away from the spectacles.

Although there may be proposed various configurations of a spectacles and sunshade-clip assembly using magnets, practically, such a spectacles and sunshade-clip assembly has not been widely used due to various inconveniences in practical use.

A main reason of a failure in commercialization of the spectacles and sunshade-clip assembly using magnets is a troublesome detachment of a sunshade-clip from spectacles. Specifically, in the case of a configuration wherein a sunshade-clip has a plurality of clip magnets mounted in tip ends of magnet mounting arms thereof, and spectacles have a plurality of spectacles magnets mounted in hinge leg units thereof that protrude toward the magnet mounting arms, whereby the sunshade-clip is attached to the spectacles by corresponding the spectacles and clip magnets in a one to one ratio, it is very troublesome to detach the sunshade-clip from the spectacles after the spectacles being worn on the wearer's ears. Furthermore, when it is necessary to repeatedly put on and take off the sunshade-clip, for example, when a wearer frequently goes inside and outside or travels roads having many tunnels, the wearer suffers from heavy attachment/detachment burden.

SUMMARY OF THE INVENTION

Therefore, the present invention has been made in view of the above problems, and it is an object of the present invention to provide a pivotally openable type spectacles and sunshade-clip assembly in which a sunshade-clip can be easily pivotally rotated upward or downward to be repeatedly detached from or attached to spectacles with an increased strong attachment force.

BRIEF DESCRIPTION OF THE DRAWINGS

The above and other objects, features and other advantages of the present invention will be more clearly understood from the following detailed description taken in conjunction with the accompanying drawings, in which:

FIG. 18 is a front perspective view illustrating a pivotally openable type spectacles and sunshade-clip assembly according to a seventh embodiment of the present invention, prior to being worn.

DETAILED DESCRIPTION OF THE INVENTION

Figure 1:
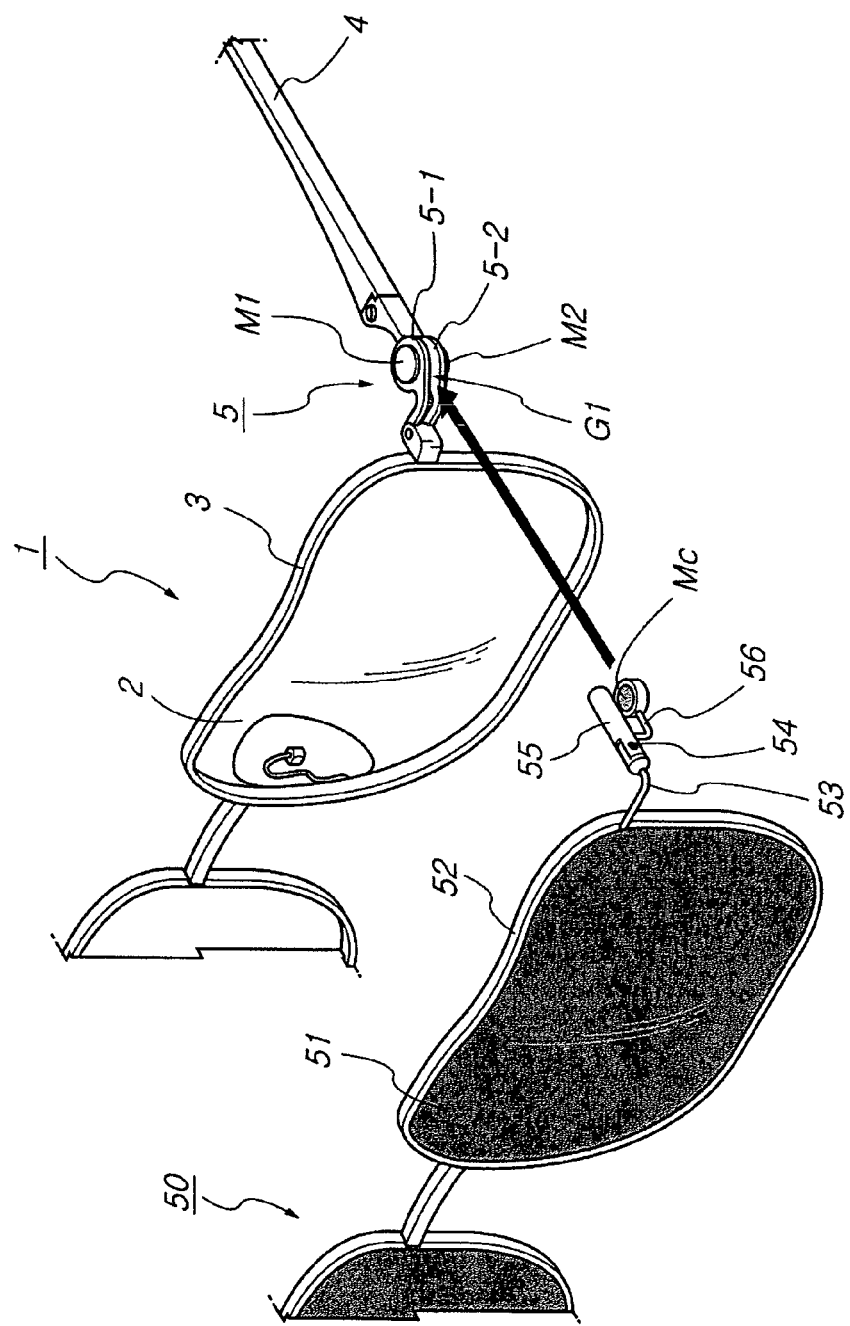
FIG. 1 is a partial perspective view illustrating a pivotally openable type spectacles and sunshade-clip assembly according to a first embodiment of the present invention, prior to being worn.

Now, a pivotally openable type spectacles and sunshade-clip assembly according to preferred embodiments of the present invention will be explained in more detail with reference to the accompanying drawings.

In the following description, left and right sides of a nose bridge, which connects a pair of lenses of spectacles or a sunshade-clip to each other, are symmetrical, and thus, only one side will be designated by reference numerals and explained. Although respective embodiments describe different configurations, identical members throughout the embodiments will be designated by the same reference numerals for clarity.

A primary object of the present invention is to achieve a sunshade-clip, which can be detachably attached to spectacles and is pivotally rotatable upward or downward to be opened away from or close to the spectacles. In this configuration, to successfully carry out the pivoting rotation, the sunshade-clip must be strongly fixed to the spectacles so as not to deviate from a correct position or to be separated from the spectacles. Therefore, the present invention aims to increase a fixing force at a pivoting position of the sunshade-clip.

Figure 2:
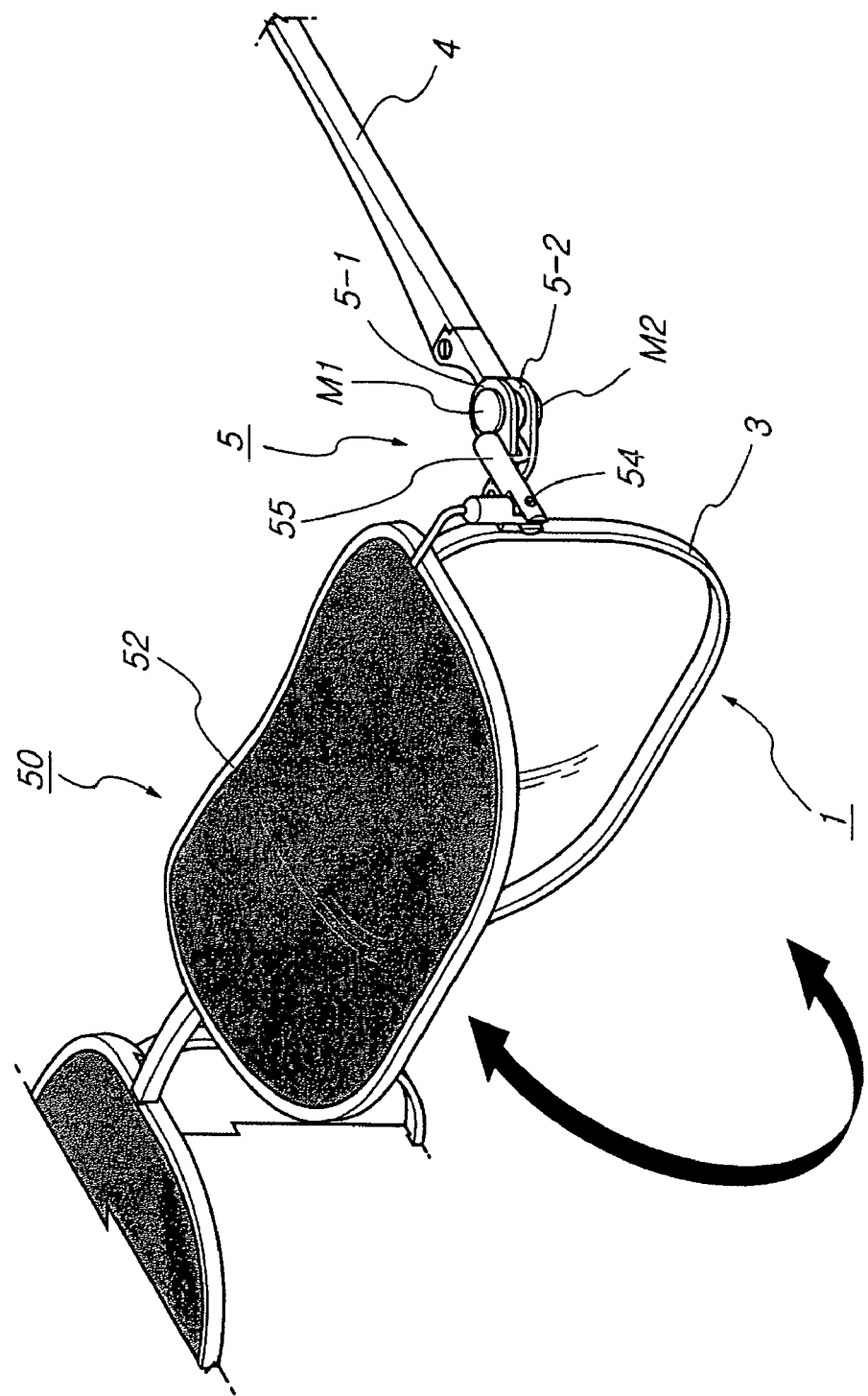
FIG. 2 is a partial perspective view of the pivotally openable type spectacles and sunshade-clip assembly of FIG. 1, illustrating a sunshade-clip pivotally rotated upward from spectacles.

Referring to FIGS. 1 and 2, a spectacles and sunshade-clip assembly according to a first embodiment of the present invention is illustrated in perspective views. As shown in FIGS. 1 and 2, spectacles 1 of the present embodiment include a pair of metallic lens frames 3 each receiving a prescription lens 2 therein, a pair of temple arms 4, and a pair of hinge units 5 used to connect the lens frames 3 to the temple arms 4, respectively. Each of the hinge units 5 includes a pair of upper and lower magnet pieces 5-1 and 5-2, which are vertically stacked one above another in a double-layered manner. A pair of spectacles magnets M1 and M2 is mounted in the upper and lower magnet pieces 5-1 and 5-2, respectively, to be horizontally oriented.

Also, a sunshade-clip 50 of the present embodiment includes a pair of clip lens frames 52 each receiving a colored clip lens 51 therein. A pair of L-shaped clip arms 53 extends rearward from opposite outer ends of the clip lens frames 52. To a respective one of the clip arms 53 is connected a hinge bar 55 by interposing a hinge shaft 54 to pivotally rotate about the hinge shaft 54. The hinge bar 55 is integrally provided at a bottom location thereof with a magnet arm 56. The magnet arm 56 receives a clip magnet Mc that is horizontally oriented to correspond to one of the spectacles magnet M1 or M2.

In use, first, the sunshade-clip 50 is moved close to the spectacles 1 before the spectacles 1 are worn on the wearer's ears as shown in FIG. 1. Then, as shown in FIG. 2, the clip magnet Mc of the sunshade-clip 50 is inserted into a predetermined gap G1 defined between the upper and lower magnet pieces 5-1 and 5-2 provided at either outer end of the spectacles 1. In this way, the sunshade-clip 50 is strongly attached to the spectacles 1. In such an attached state, if the sunshade-clip 50 is pivotally rotated upward about the hinge shaft 54 of the hinge bar 55, the sunshade-clip 50 is opened away from the spectacles 1. Thereby, the sunshade-clip 50 can be repeatedly opened away from or close to the spectacles 1 via a simple pivoting rotation by one hand.

Figure 3:
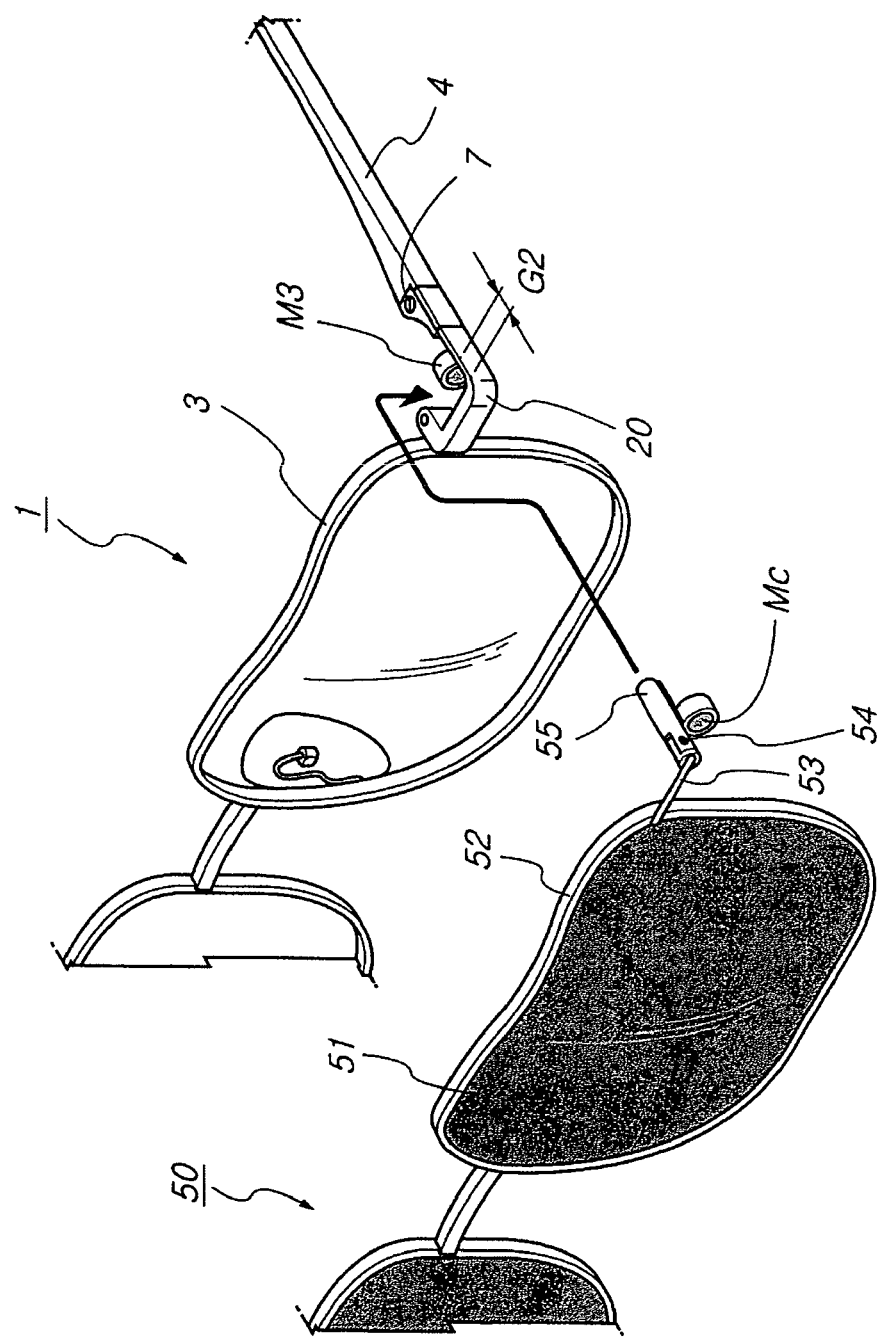
FIG. 3 is a partial perspective view illustrating a pivotally openable type spectacles and sunshade-clip assembly according to a second embodiment of the present invention, prior to being worn.
Figure 4:
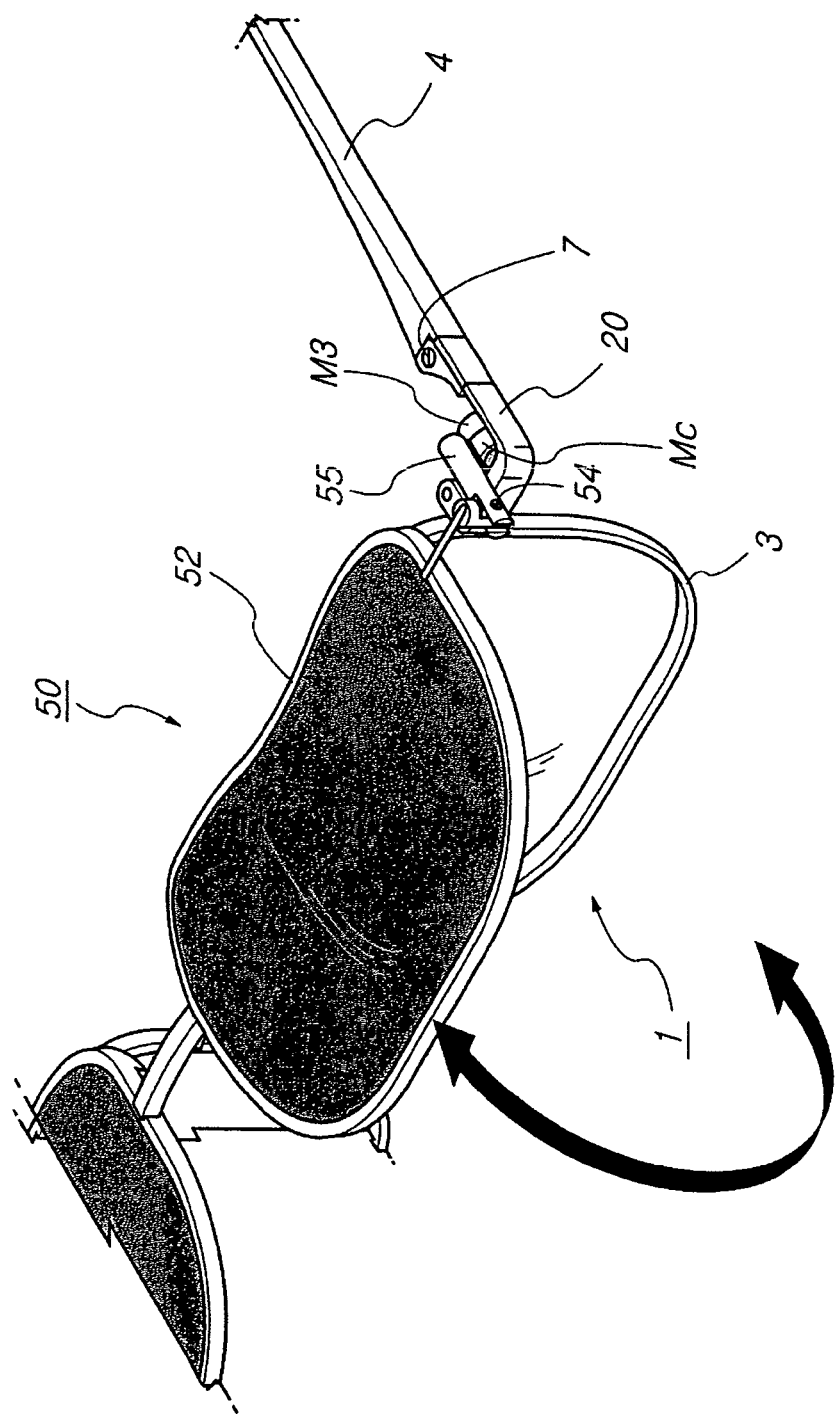
FIG. 4 is a partial perspective view of the pivotally openable type spectacles and sunshade-clip assembly of FIG. 3, illustrating a sunshade-clip pivotally rotated upward from spectacles.

FIGS. 3 and 4 illustrate a pivotally openable type spectacles and sunshade-clip assembly according to a second embodiment of the present invention. In the present embodiment, the pair of lens frame 3 of the spectacles 1 is provided at opposite outer ends thereof with a pair of bent hinge arms 20. That is, one end of each bent hinge arm 20 is fixed to one of the lens frames 3 and the other end of the hinge arm 20 is connected to one of the temple arms 4 by means of a bolt 7. In the present embodiment, a vertically oriented spectacles magnet M3 is mounted to a location of the hinge arm 20 so that it is spaced apart from a rear surface of the hinge arm 20 by a predetermined gap G2.

The sunshade-clip 50 is provided with the pair of L-shaped clip arms 53, which extends rearward from opposite outer ends of the pair of clip lens frames 52 each receiving the colored clip lens 51 therein. Each clip arm 53 is connected to the hinge bar 55, so that the hinge bar 55 is pivotally rotatable about the hinge shaft 54. In the present embodiment, the clip magnet Mc is attached to the bottom location of the hinge bar 55 to be vertically oriented to correspond to the spectacles magnet M3.

In use, first, the sunshade-clip 50 is moved close to the spectacles 1 before the spectacles 1 are worn on the wearer's ears as shown in FIG. 3. Then, as shown in FIG. 4, the clip magnet Mc of the sunshade-clip 50 is inserted into the gap G2 defined between the rear surface of the hinge arm 20 and the spectacles magnet M3, so that the clip magnet Mc is strongly attached to the spectacles magnet M3. In such an attached state, if the sunshade-clip 50 is pivotally rotated upward about the hinge shaft 54 of the hinge bar 55, the sunshade-clip 50 is opened away from the spectacles 1.

Figure 5:
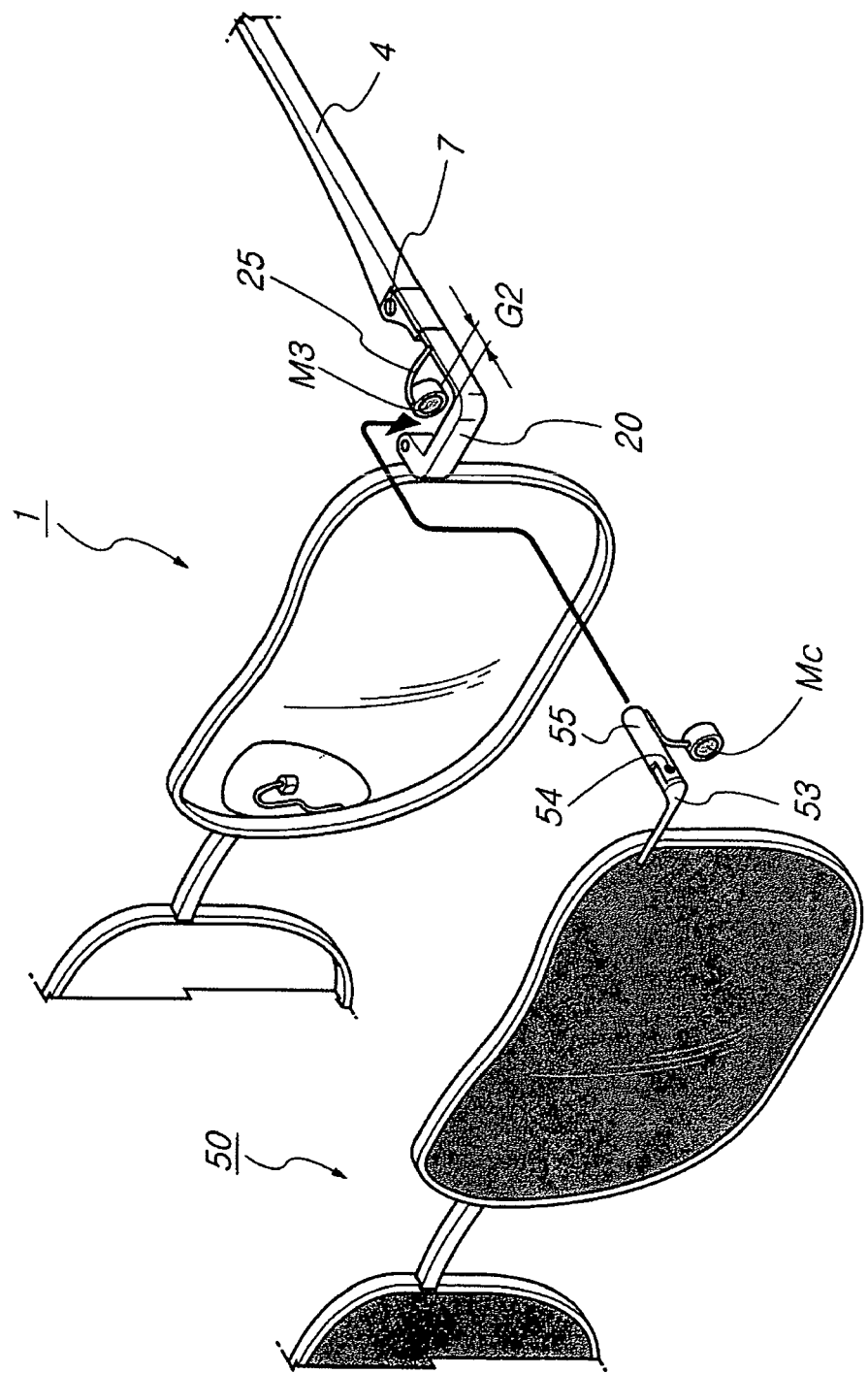
FIG. 5 is a partial perspective view illustrating a first alternative example of the second embodiment of FIG. 3.

Referring to FIG. 5 illustrating a first alternative example of the above-described second embodiment, rather than coming into contact with the hinge arm 20, the spectacles magnet M3 may be suspended from a bar 25 that protrudes inward from a lateral location of the hinge arm 20 while being spaced apart from the rear surface of the hinge arm 20.

Figure 6:
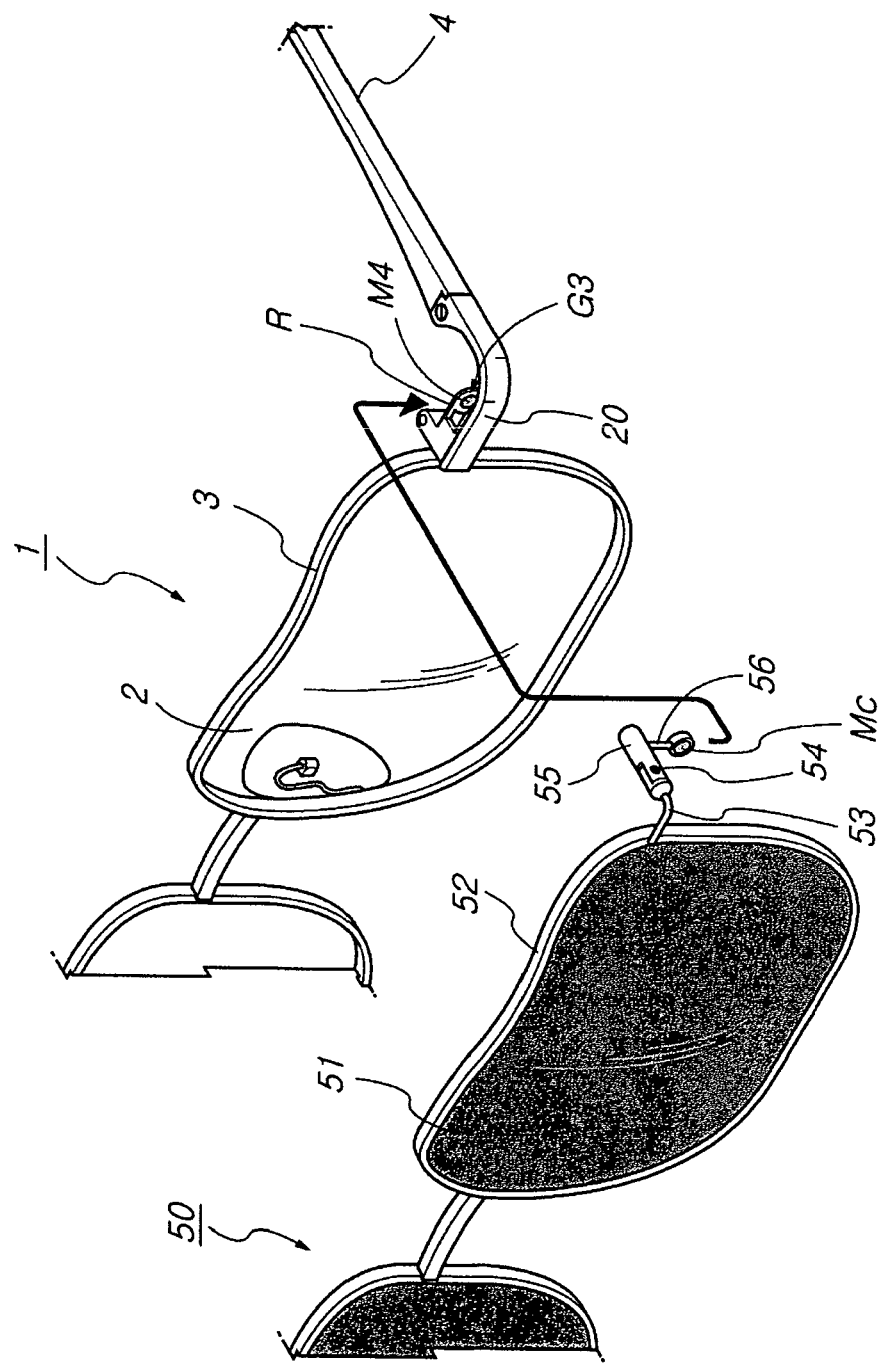
FIG. 6 is a partial perspective view illustrating a second alternative example of the second embodiment of FIG. 3.

Referring to FIG. 6 illustrating a second alternative example of the above-described second embodiment, the hinge arm 20 may be provided with a rear extension R, which defines a predetermined gap G3 with the rear surface of the hinge arm 20. A spectacles magnet M4 is mounted in the rear extension R.

Figure 7:
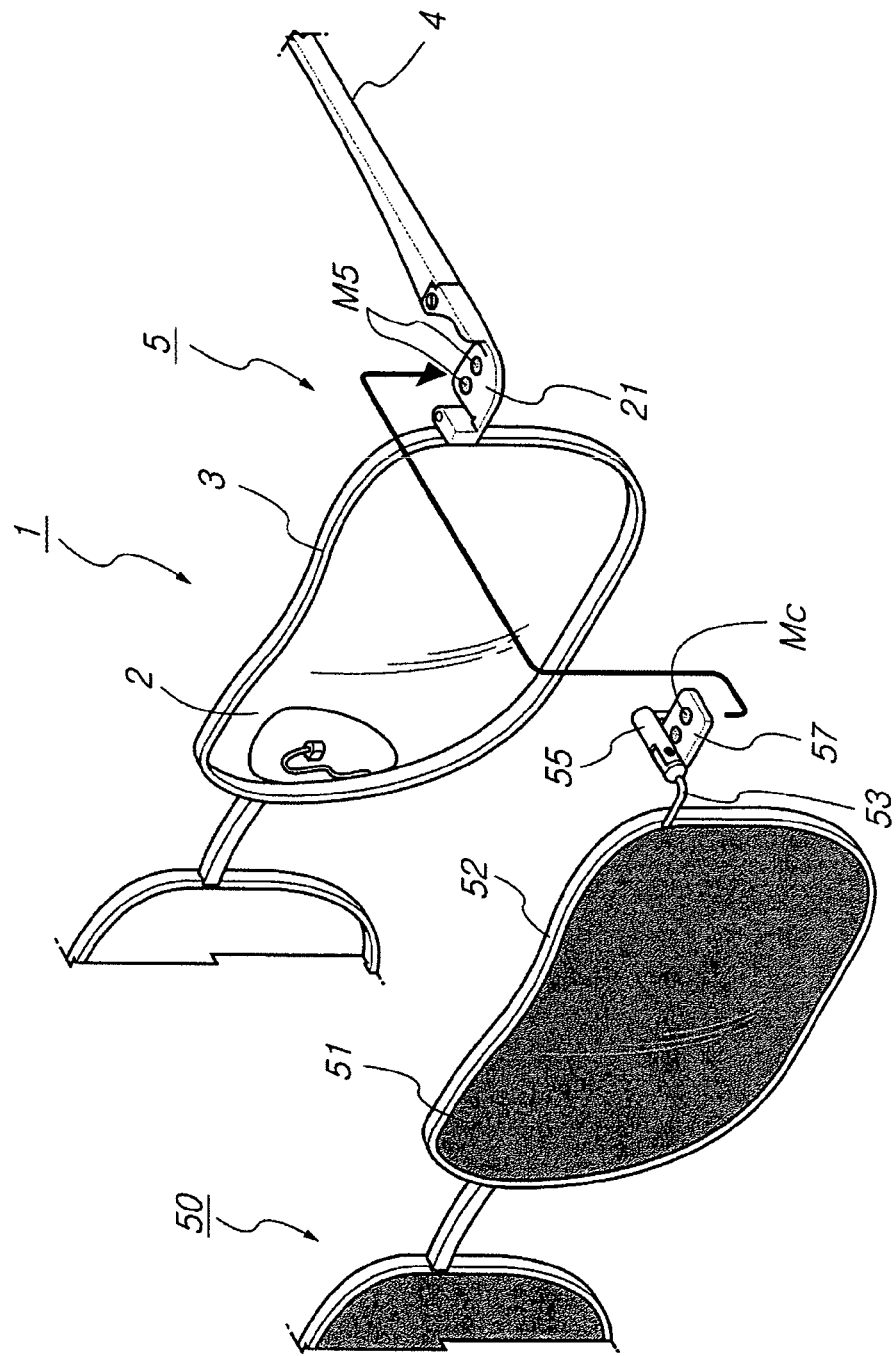
FIG. 7 is a partial perspective view illustrating a third alternative example of the second embodiment of FIG. 3.

Referring to FIG. 7 illustrating a third alternative example of the above-described second embodiment, the hinge arm 20 may have a flat panel portion 21 so that a plurality of spectacles magnets M5 is mounted in the flat panel portion 21. In this case, the hinge bar 55 of the sunshade-clip 50 corresponding to the hinge arm 20 may have a magnet panel 57 to mount a plurality of clip magnets Mc.

Figure 8:
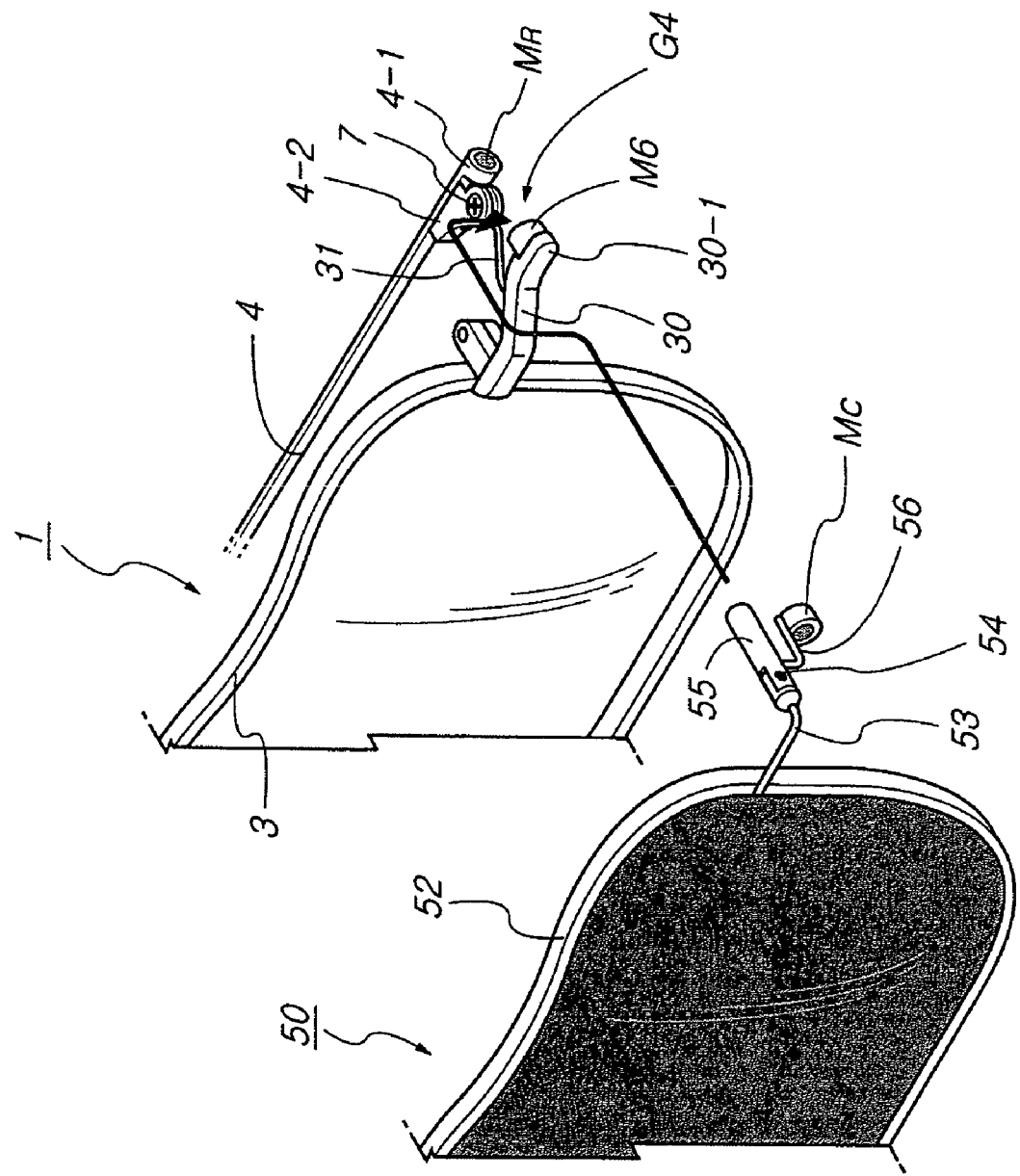
FIG. 8 is a partial perspective view illustrating a pivotally openable type spectacles and sunshade-clip assembly according to a third embodiment of the present invention, prior to being worn.

FIG. 8 illustrates a pivotally openable type spectacles and sunshade-clip assembly according to a third embodiment of the present invention. In the present embodiment, a hinge unit, used to connect one of the lens frames 3 to one of the temple arms 4, includes a first hinge arm 30, and a second hinge arm 31. The first hinge arm 30 is a protrusion fixed to the lens frame 3, and the second hinge arm 31 is a wire fixed to a rear location of the first hinge arm 30. The first and second hinge arms 30 and 31 form a multistage hinge unit.

A free end of the second hinge arm 31 is hingedly connected to a hinge shaft portion 4-2, which is fixed close to an end 4-1 of the temple arm 4, by means of a bolt 7 screwed through a shaft hole (not designated) of the hinge shaft portion 4-2. A locking magnet MR is inserted into the end 4-1 of the temple arm 4 in front of the hinge shaft portion 4-2. Also, a hinge magnet M6 is inserted into a rear location of a free end 30-1 of the first hinge arm 30.

The second hinge arm 31 is pivotally rotated relative to the first hinge arm 30 to unfold the temple arm 4, so that the spectacles 1 are worn on the wearer's ears. In such an unfolded state of the temple arm, a predetermined gap G4 is defined between a front surface of the locking magnet MR mounted in the end 4-1 of the temple arm 4 and a rear surface of the hinge magnet M6 mounted in the end 30-1 of the first hinge arm 30. Here, the gap G4 is slightly smaller than a width of the clip magnet Mc of the sunshade-clip 50, and the sunshade-clip 50 has the same configuration as that of the first embodiment.

In use, first, the sunshade-clip 50 is moved close to the spectacles 1 in a state wherein the temple arm 4 of the spectacles 1 is folded as shown in FIG. 8, so that the clip magnet Mc mounted in an end of the clip arm 53 is attached to the hinge magnet M6 mounted in the end 30-1 of the first hinge arm 30. Then, if the temple arm 4 is unfolded, the clip magnet Mc is pressed by the locking magnet MR mounted in the end 4-1 of the temple arm 4, thereby being strongly locked relative to the locking magnet MR. This completely prevents the sunshade-clip 50 from being separated from the spectacles 1 or deviating from a correct position even if a wearer carries out intense exercise such as sports. Also, the strong locking enables the sunshade-clip 50 to be stably pivotally rotated, in order to be opened away from the spectacles 1.

Figure 9:
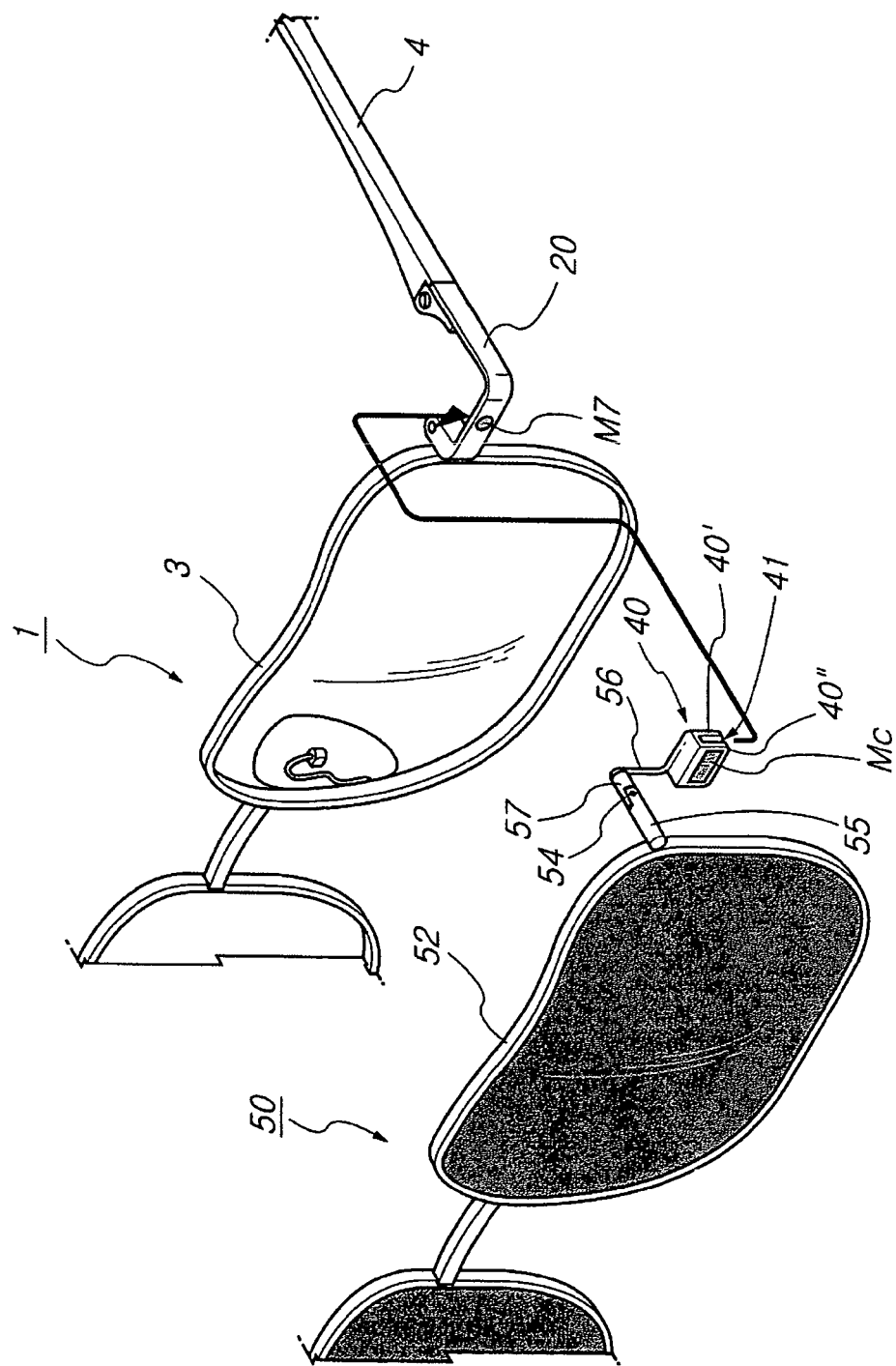
FIG. 9 is a partial perspective view illustrating a pivotally openable type spectacles and sunshade-clip assembly according to a fourth embodiment of the present invention, prior to being worn.
Figure 10:
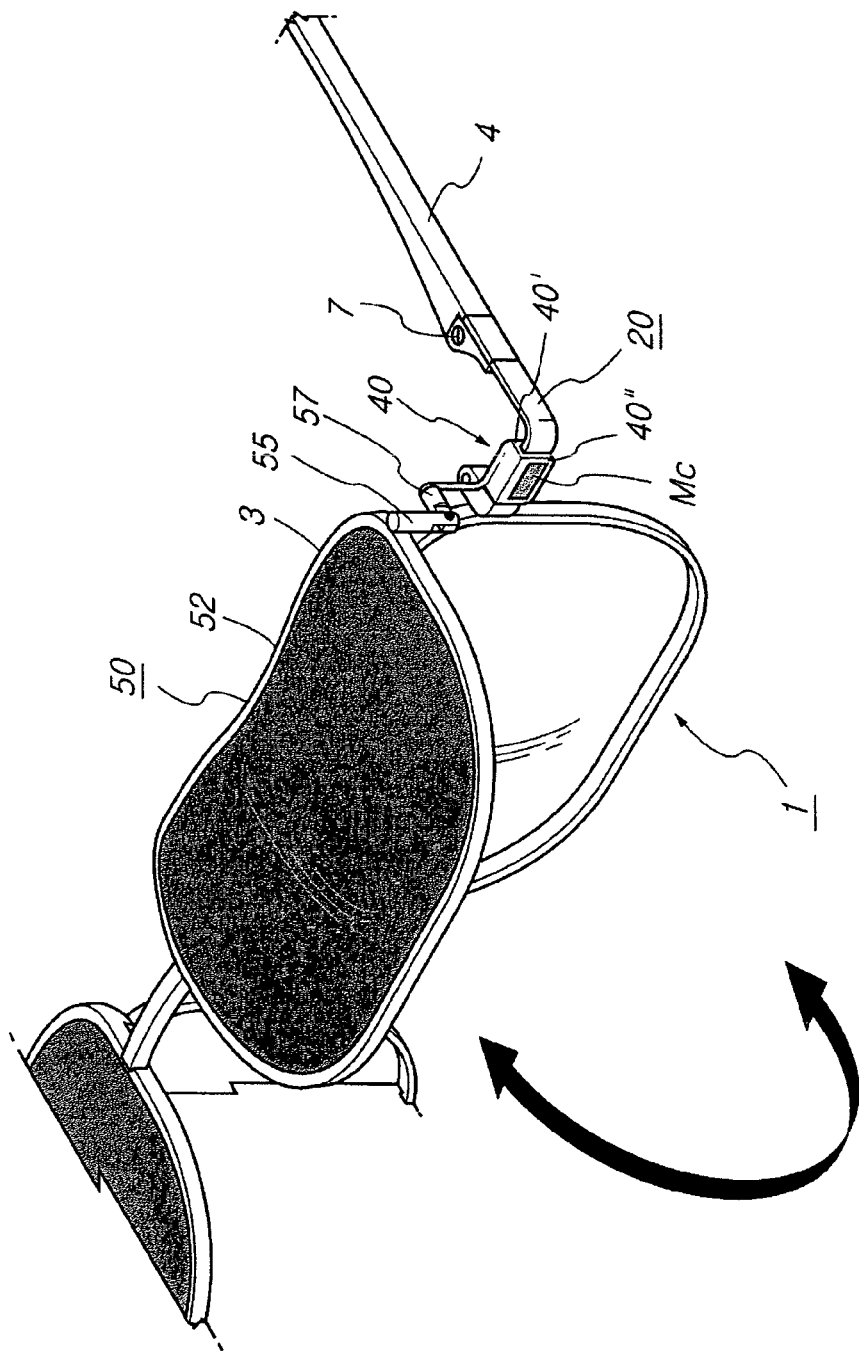
FIG. 10 is a partial perspective view of the pivotally openable type spectacles and sunshade-clip assembly of FIG. 9, illustrating a sunshade-clip pivotally rotated upward from spectacles.

FIGS. 9 and 10 illustrate a pivotally openable type spectacles and sunshade-clip assembly according to a fourth embodiment of the present invention. In the present embodiment, a spectacles magnet M7 is inserted into a front location of the bent hinge arm 20, which is fixed to one of the lens frames 3 to be connected to one of the temple arms 4 by means of the bolt 7.

In the present embodiment, the hinge bar 55 is directly fixed to one of the clip lens frames 52, each receiving the colored clip lens 51 therein, at a position close to an upper end of the lens frame 52 to extend rearward. The hinge shaft 54 is located at a rear end of the hinge bar 55. Also, a bent bar arm 57 is interposed between the hinge shaft 54 and the magnet arm 56 that vertically extends downward so that an insert 40 is fixed to a lower end of the magnet arm 56. The insert 40 is divided into a pair of insert pieces 40' and 40" to have an approximately inverted U-shaped insert groove 41 between the insert pieces 40' and 40". At least one of the insert pieces 40' and 40" is provided with the clip magnet Mc.

In use, first, the sunshade-clip 50 is moved close to the spectacles 1 before the spectacles 1 are worn on the wearer's ears as shown in FIG. 9. Then, as shown in FIG. 10, the clip magnet Mc mounted in the insert 40 of the sunshade-clip 50 is attached to the spectacles magnet M7 as the hinge arm 20 is inserted into the insert groove 41 formed in the insert 40. In this way, the sunshade-clip 50 is strongly attachment to the spectacles 1. In such an attached state, if the sunshade-clip 50 is pivotally rotated upward about the hinge shaft 54 of the hinge bar 55, the sunshade-clip 50 is opened away from the spectacles 1.

Figure 11:
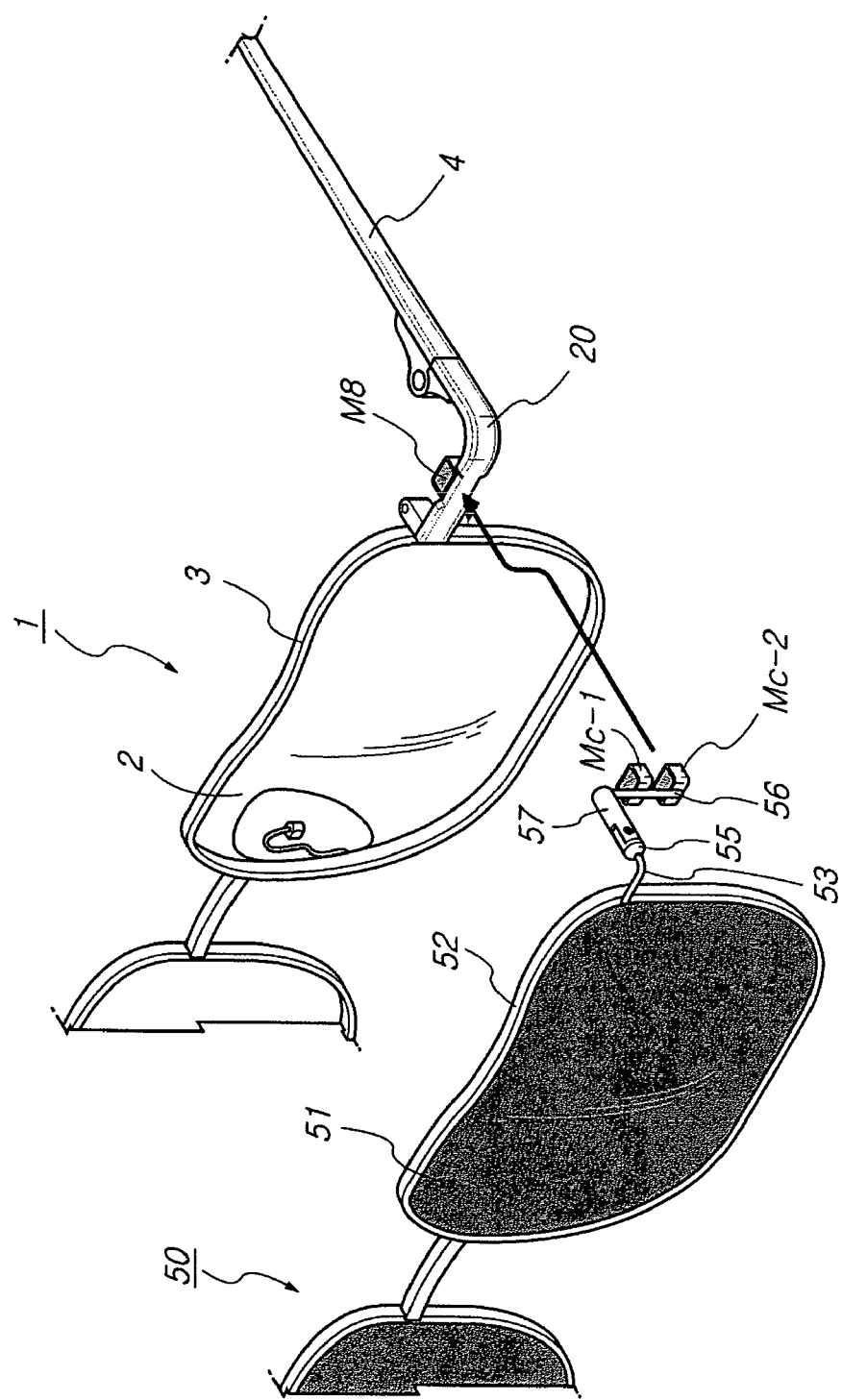
FIG. 11 is a partial perspective view illustrating an alternative example of the fourth embodiment, prior to being worn.

Referring to FIG. 11 illustrating an alternative example of the fourth embodiment, instead of the insert 40, the sunshade-clip 50 is provided with a pair of upper and lower clip magnets Mc-1 and Mc-2. The upper and lower clip magnet Mc-1 and Mc-2 are mounted to the vertical magnet arm 56 so that they are vertically spaced apart from each other. Correspondingly, the spectacles 1 are provided with a box-shaped spectacles magnet M8 attached to the rear surface of the hinge arm 20. In use, both the hinge arm 20 and the spectacles magnet M8 are inserted between the upper and lower clip magnets Mc-1 and Mc-2 of the magnet arm 56.

Figure 12:
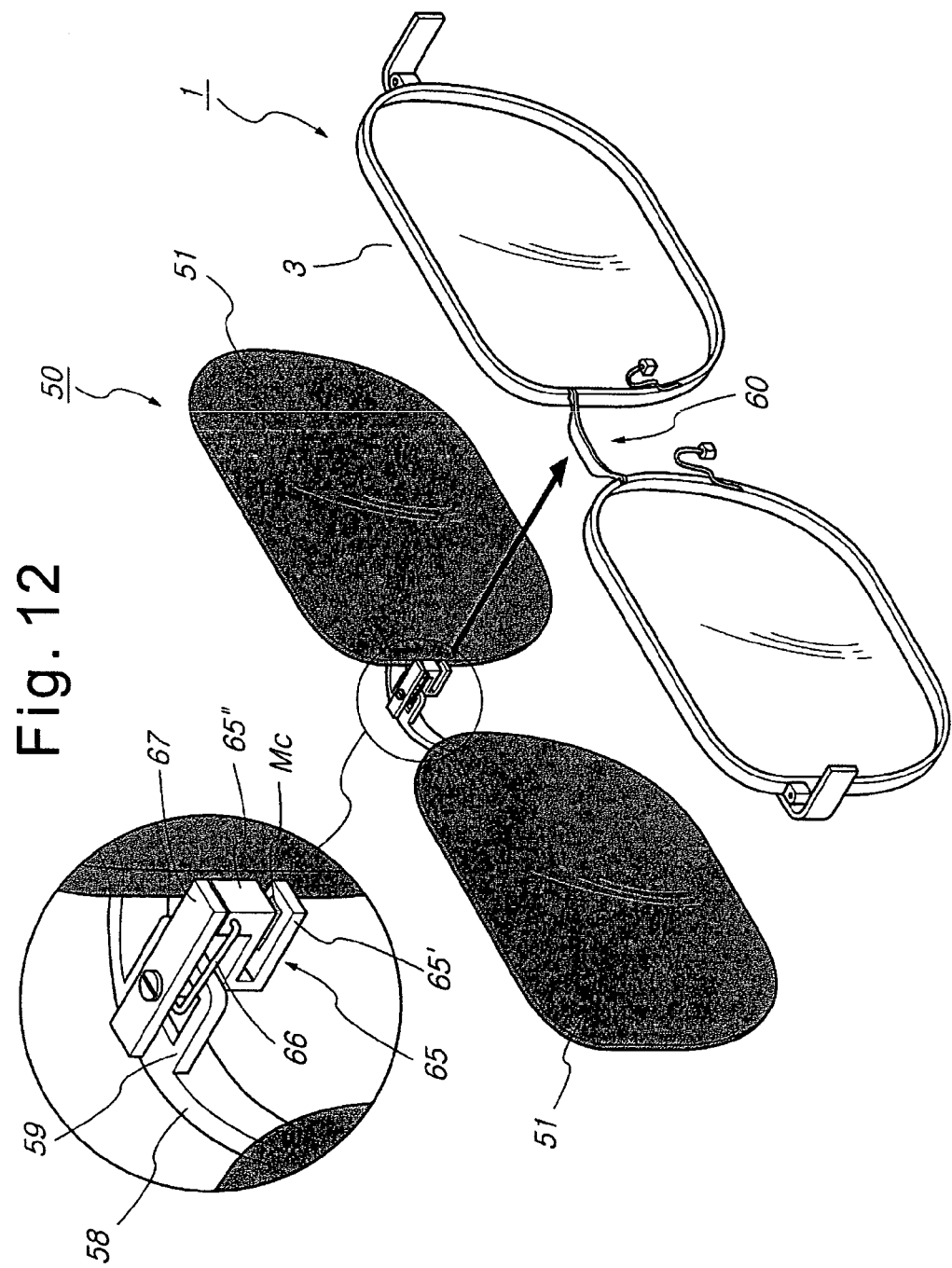
FIG. 12 is a rear perspective view illustrating a pivotally openable type spectacles and sunshade-clip assembly according to a fifth embodiment of the present invention, prior to being worn.
Figure 13:
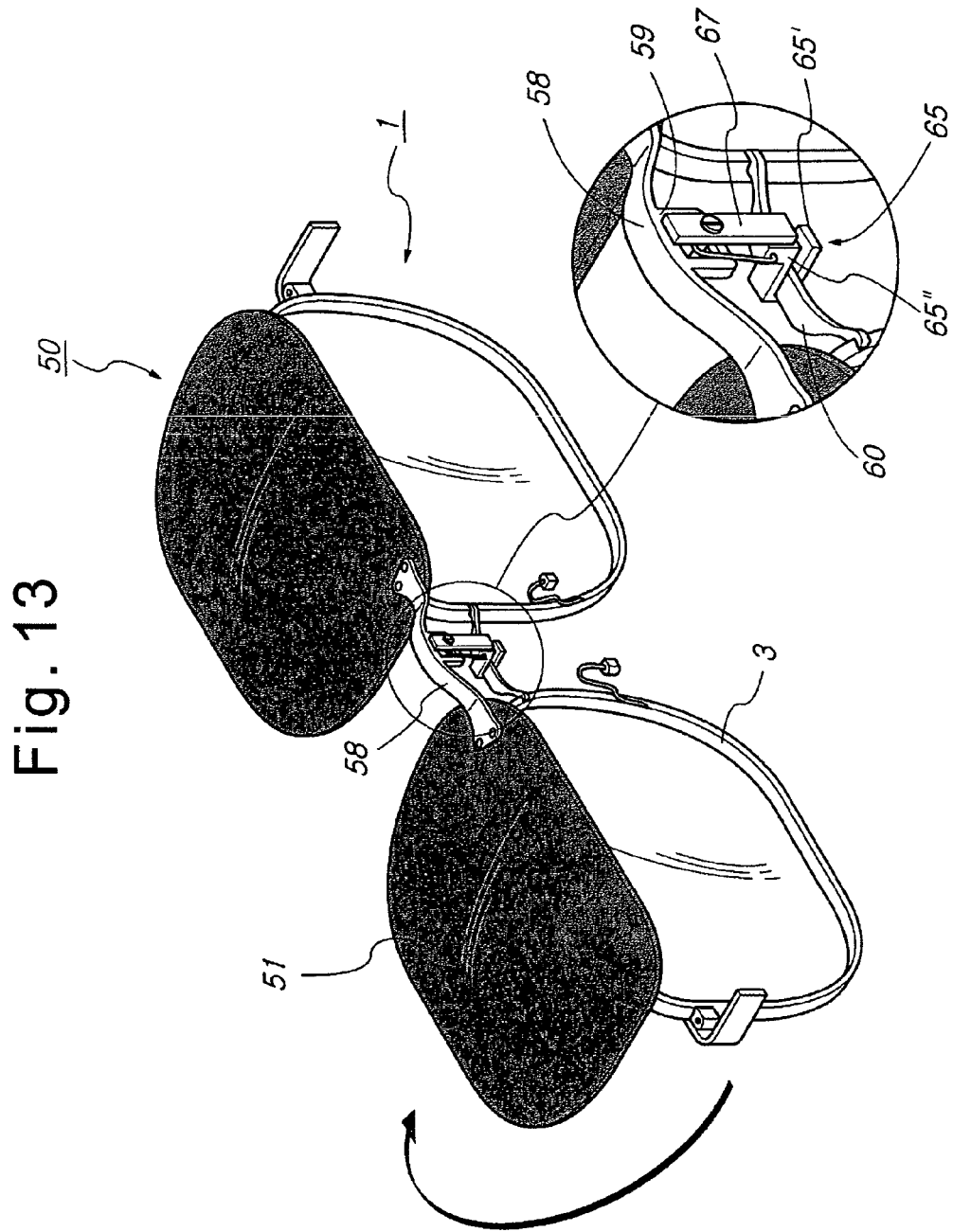
FIG. 13 is a rear perspective view of the pivotally openable type spectacles and sunshade-clip assembly of FIG. 12, illustrating a sunshade-clip pivotally rotated upward to be opened away from spectacles in a worn state.

FIGS. 12 and 13 illustrate a pivotally openable type spectacles and sunshade-clip assembly according to a fifth embodiment of the present invention. In the present embodiment, a nose bridge 60, having a horizontal plate shape, is interposed between both the metallic lens frames 3 of the spectacles 1. The nose bridge 60 may be made of a material selected from among various magnetic materials that can be attracted by magnets, or may be provided therein with a spectacles magnet.

To correspond to the spectacles 1, the sunshade-clip 50 may be deformed into various shapes. Preferably, the sunshade-clip 50 is configured in such a fashion that a pair of molded clip lenses 51 is interconnected by use of a clip bridge 58 without lens frames, as shown in FIGS. 12 and 13. In the present embodiment, a flange 59 protrudes rearward from the clip bridge 58, and in turn, an elastic piece 67 is bolted to the flange 59, so that a fixture arm 66 is fixed relative to the clip bridge 58 at a position higher than the clip bridge 58. The fixture arm 66 takes the form of an approximately rectangular hollow frame, and serves to hingedly support an insert 65 having an angled U-shaped cross section.

The elastic piece 57 is configured to press an upper end of the insert 65 downward at a tip end 67' thereof. Due to an angled shape thereof, accordingly, the insert 65 can be elastically fixed at a pivoting position in accordance with operation of the elastic piece 67.

The angled U-shaped insert 65 is divided into a pair of insert pieces 65' and 65", which are horizontally arranged to face each other. At least one of the insert pieces 65' and 65" is provided with the clip magnet Mc.

Before the spectacles 1 are worn on the wearer's ears, as shown in FIG. 12, the insert 65, fixed to the clip bridge 58 of the sunshade-clip 50, is fitted to the nose bridge 60 of the spectacles 1.

If the insert 65 is firmly fitted to the nose bridge 60, the sunshade-clip 50 is pivotally rotated upward about the fixture arm 66 by overcoming the elasticity of the elastic piece 67, thereby being opened away from the spectacles 1 as shown in FIG. 13.

Figure 14:
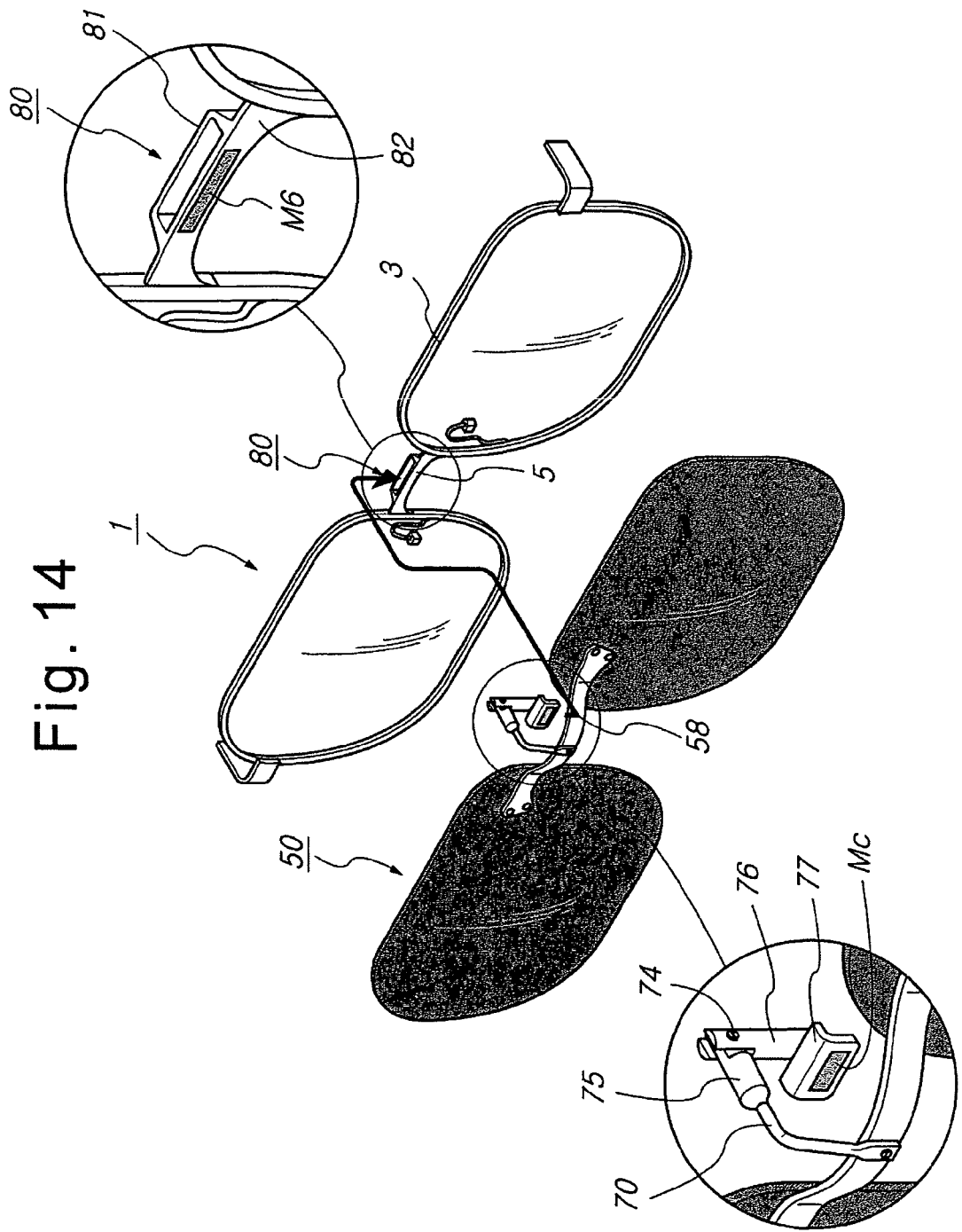
FIG. 14 is a rear perspective view illustrating a pivotally openable type spectacles and sunshade-clip assembly according to a sixth embodiment of the present invention, prior to being worn.
Figure 15:
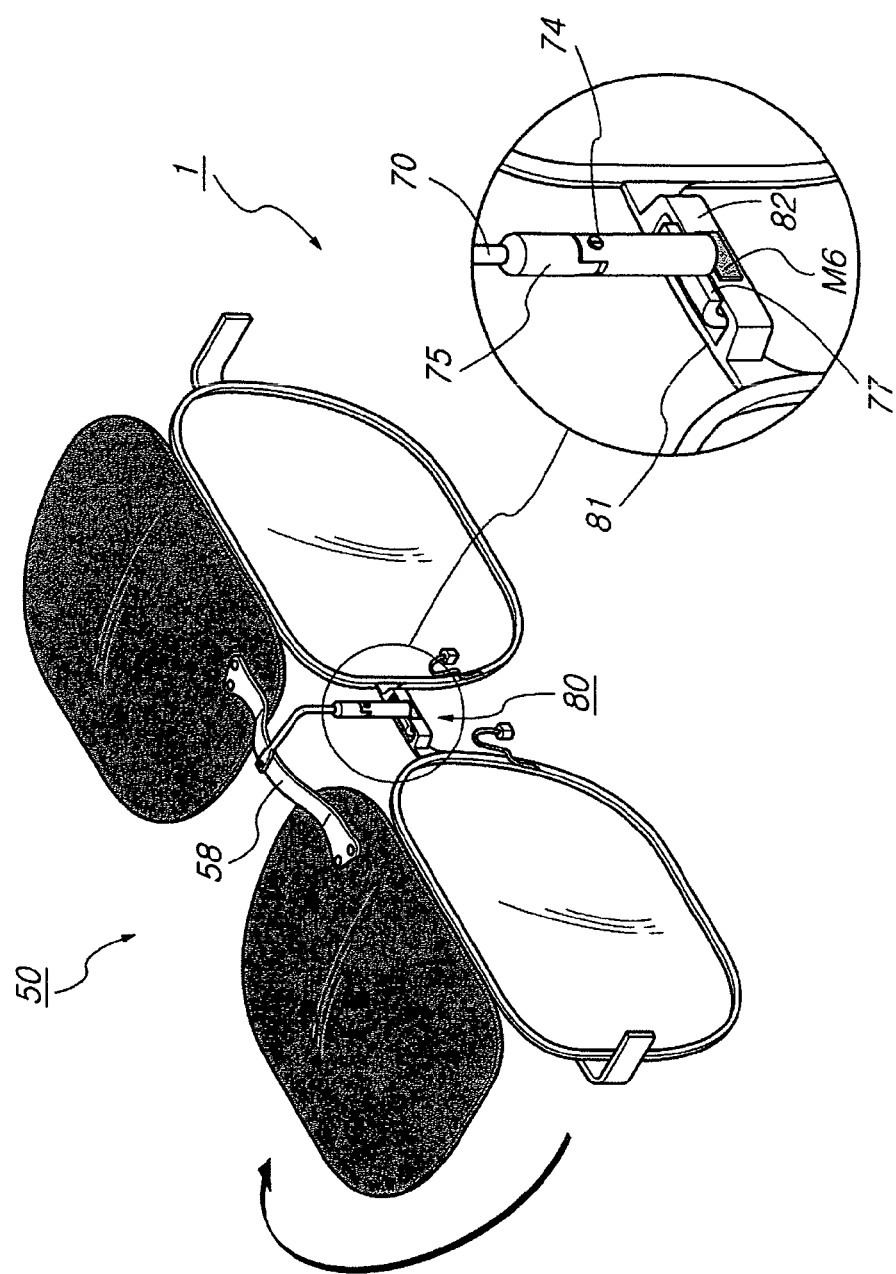
FIG. 15 is a front perspective view of the pivotally openable type spectacles and sunshade-clip assembly of FIG. 14, illustrating a sunshade-clip pivotally rotated upward to be opened away from spectacles in a worn state.

FIGS. 14 and 15 illustrate a pivotally openable type spectacles and sunshade-clip assembly according to a sixth embodiment of the present invention. The present embodiment is intended to achieve improved nose bridge and clip bridge of both the spectacles 1 and the sunshade-clip 50. Similar to the above-described fifth embodiment, the sunshade-clip 50 is a rimless sunshade-clip having injection molded clip lenses. In the present embodiment, the sunshade-clip 50 includes an upright arm 70 fixed to the clip bridge 58. The upright arm 70 has an approximately L-shaped form, and is fabricated by molding a metal material. The upright arm 70 is integrally screwed or fitted to the center of the clip bridge 58.

A hinge bar 75 is connected to a free end of the upright arm 70, and, in turn, the hinge bar 75 is hingedly connected to a hinge shaft 74 to be pivotally rotated upward and downward about the hinge shaft 74 by a predetermined angle. Also, a pivot arm 76 extends downward from a free end of the hinge shaft 74, and an insert 77 is fixed to a lower end of the pivot arm 76.

The insert 77 may be made of one selected from among a magnetic substance, a magnetized substance, a magnet, a magnet reactant, and a plastic magnet, or may be formed as a metal piece so that the clip magnet Mc is mounted therein via insertion, welding, adherence, or attachment.

With the above-described configuration, the sunshade-clip 50 is pivotally rotatable upward and downward about the hinge shaft 74. More preferably, the hinge shaft 74 may be a conventional spring hinge in which a spring is received to achieve a desired elasticity during a pivoting rotation of the hinge shaft 74.

The spectacles 1 corresponding to the above-described sunshade-clip 50 includes a fixture channel 80, which is fixed to the nose bridge 5. In the present embodiment, the nose bridge 5 has a metal plate shape, and the fixture channel 80 has an approximately hollow rectangular frame shape. The fixture channel 80 is divided into a pair of channel pieces 81 and 82.

The fixture channel 80 may be made of one selected from among a metal plate, a magnetic plastic, a magnetic substance, a magnetized substance, and a magnet reactant metal, or may have a separate spectacles magnet M6 received in at least one of the channel pieces 81 and 82.

Now, the operation and effects of the present embodiment having the above-described configuration will be explained.

To attach the sunshade-clip 50 to the spectacles 1, as shown in FIG. 15, first, the insert 77, which is mounted at the end of the upright arm 70 connected to the clip bridge 58 of the sunshade-clip 50, is inserted into the hollow rectangular frame shaped fixture channel 80 of the spectacles 1, so that the insert 77 is magnetically attached to the fixture channel 80. In such an attached state, the insert 77 can be strongly caught by the fixture channel 80 by virtue of the geometrical blockage structure of the fixture channel 80.

After the insert 77 is caught by the fixture channel 80, the sunshade-clip 50 can be pivotally rotated upward about the hinge shaft 74 in accordance with a manual operation.

Figure 16:
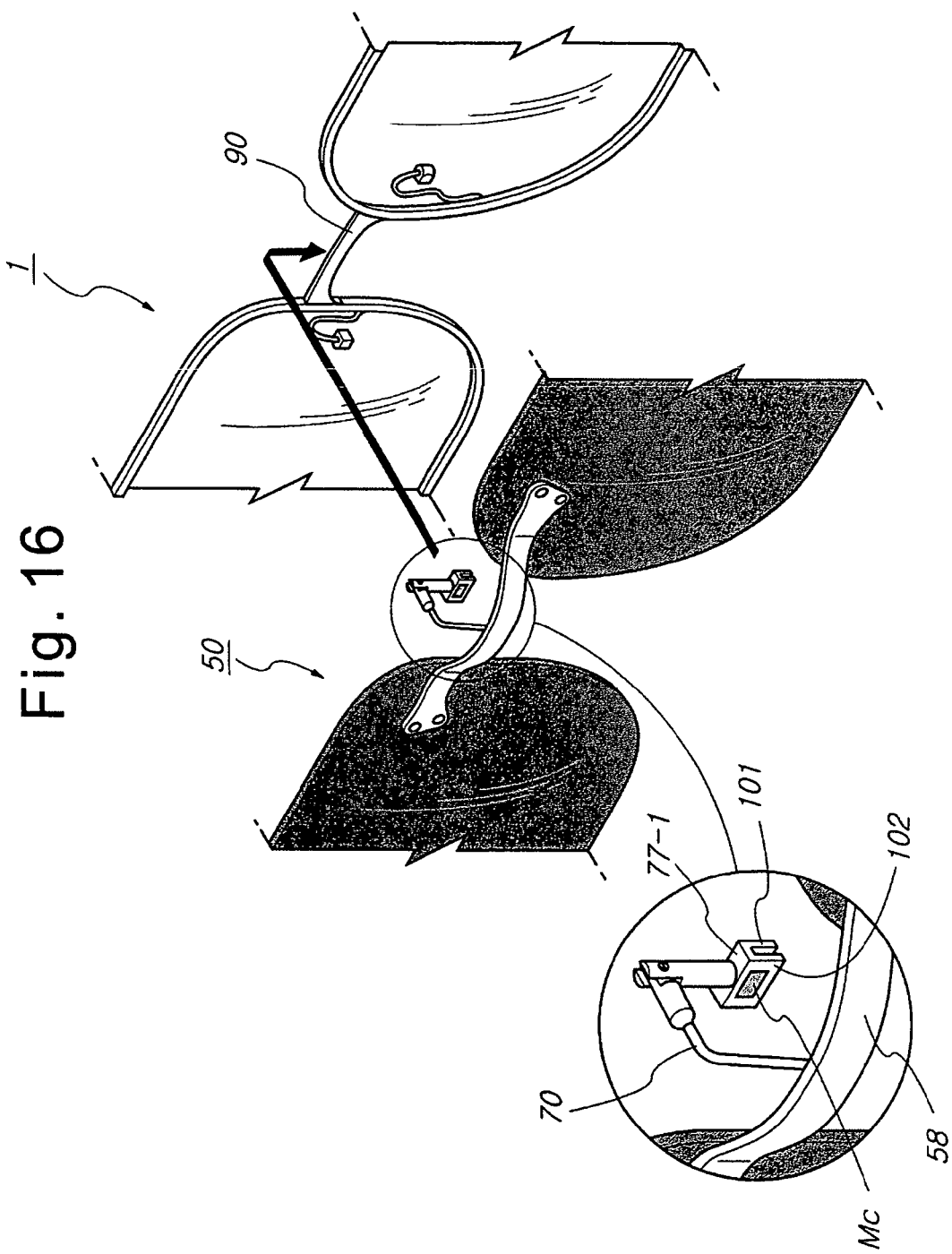
FIG. 16 is a front perspective view illustrating a first alternative example of the sixth embodiment of FIG. 14.

Referring to FIG. 16 illustrating a first alternative example of the above-described sixth embodiment, the spectacles 1 may include a nose bridge 90 having a vertical plate shape, and correspondingly, the sunshade-clip 50 may include a channel insert 77-1 having an approximately inverted U-shaped cross section.

Here, the plate-shaped nose bridge 90 may be made of one selected from among various metal materials that can be attracted by a magnet, or may have a magnet (not shown) via an insert molding.

The channel insert 77-1 includes a pair of channel pieces, which define a channel therebetween, so that the plate-shaped nose bridge 90 of the spectacles 1 is inserted into the channel to achieve an increased mechanical stability. Advantageously, at least one of the channel pieces may be provided with a magnet to increase a fixing force thereof.

Figure 17:
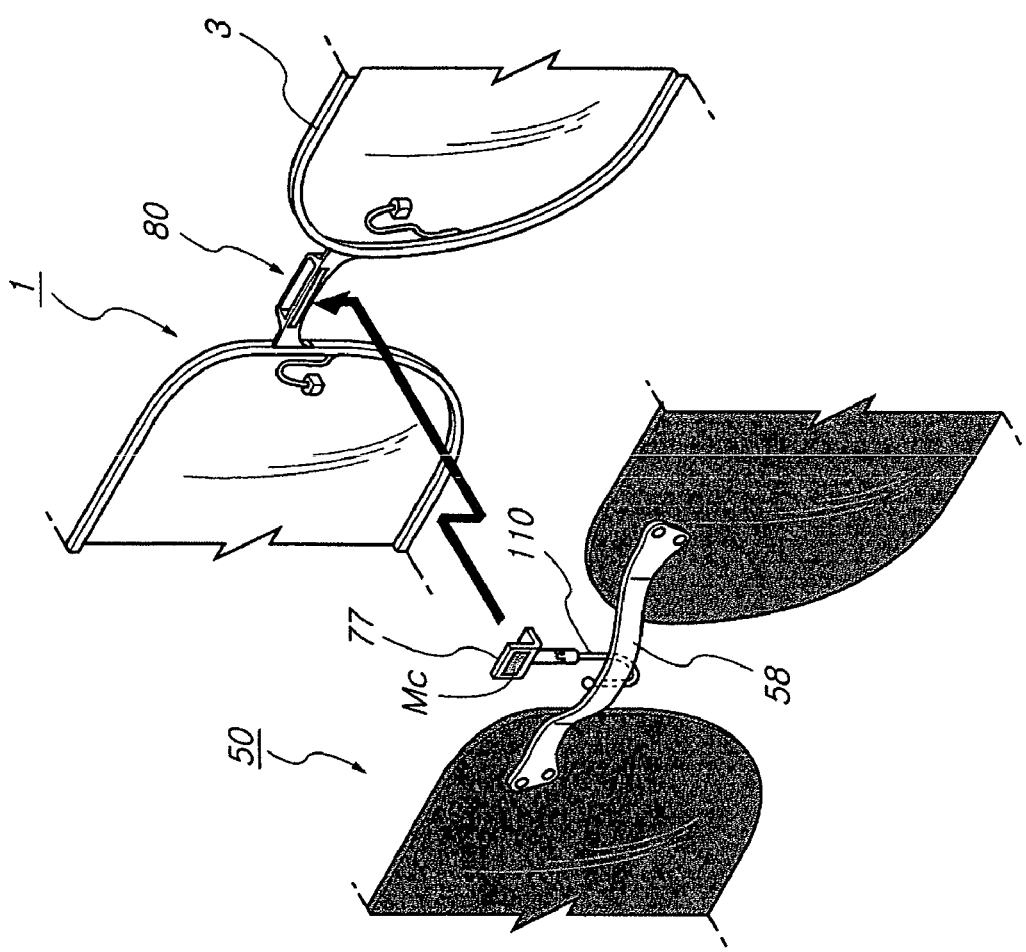
FIG. 17 is a front perspective view illustrating a second alternative example of the sixth embodiment of FIG. 14.

Referring to FIG. 17 illustrating a second alternative example of the above-described sixth embodiment, an approximately U-shaped upright arm 110 is fixed to the clip bridge 58 of the sunshade-clip 50, so that the fixture channel 80 of the spectacles 1 is downwardly fitted into the upright arm 110. In the alternative example, the position of the clip bridge 58 is lowered as compared to that of the sixth embodiment, but other operation thereof is identical.

FIG. 18 illustrates a pivotally openable type spectacles and sunshade-clip assembly according to a seventh embodiment of the present invention. In the present embodiment, a pair of an upright arm 120 and a channel insert 100 is provided at either outer end of the sunshade-clip 50. Correspondingly, the spectacles 1 include a hinge unit 130 interposed between one of the lens frames and one of the temple arms. The hinge unit 130 of the present embodiment includes a fixture channel 131 having a hollow rectangular frame shape corresponding to the channel insert 100.

The seventh embodiment effectively increases a fixing force of the sunshade-clip 50 relative to the spectacles 1 as compared to the sixth embodiment.

As is apparent from the above description, the present invention provides a pivotally openable type spectacles and sunshade-clip assembly, which can considerably increase a fixing force of a sunshade-clip relative to spectacles. Accordingly, the present invention has the effect of preventing shaking or separation of the sunshade-clip even if the sunshade-clip is repeatedly pivotally rotated upward or downward to be opened away from or close to the spectacles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pivotally openable spectacles and sunshade-clip assembly comprising:

spectacles including a pair of lens frames each receiving a prescription lens therein, a pair of temple arms, a pair of hinge units provided at opposite outer ends of the spectacles, each hinge unit being used to hingedly connect one of the lens frames to one of the temple arms, and a plurality of spectacles magnets mounted in each of the hinge units: and a sunshade-clip including a pair of clip lens frames each receiving a colored clip lens therein, a pair of hinge arm units, and a pair of clip magnets mounted to the hinge arm units, respectively, the sunshade-clip being pivotally rotatable relative to the spectacles about the hinge arm units after being attached to the spectacles by use of the corresponding spectacles magnets and clip magnets, wherein each of the hinge units of the spectacles includes a pair of upper and lower magnet pieces, which are vertically stacked one above another in a double-layered manner, the spectacles magnets being mounted in the upper and lower magnet pieces, respectively, to be horizontally oriented, and wherein each of the hinge arm units of the sunshade-clip includes: an L-shaped clip arm extending rearward from one of the clip lens frames;

a hinge shaft fixed to a free end of the clip arm; a hinge bar connected to the clip arm to pivotally rotate about the hinge shaft interposed between the clip arm and the hinge bar;

and a magnet arm integrally fixed to a bottom location of the hinge bar, one of the clip magnets being received in the magnet arm.

2. The assembly as set forth in claim 1, wherein each of the hinge units of the spectacles includes a bent hinge arm fixed to an outer end of one of the lens frames to be connected to one of the temple arms by means of a bolt, a single spectacles magnet being spaced apart from a rear surface of the hinge arm by a predetermined gap, and wherein the L-shaped clip arm, which extends rearward from one of the clip lens frames of the sunshade-clip, is connected to the hinge bar that is pivotally rotatable about the hinge shaft, the clip magnet being attached to the bottom location of the hinge bar.

3. The assembly as set forth in claim 2, wherein the spectacles magnet is suspended from a bar that protrudes inward from a lateral location of the hinge arm while being spaced apart from the rear surface of the hinge arm.

4. The assembly as set forth in claim 2, wherein the hinge arm is provided with a rear extension, which defines a predetermined gap with the rear surface of the hinge arm, the rear extension being used to mount the spectacles magnet.

5. The assembly as set forth in claim 2, wherein the hinge arm of the spectacles has a flat panel portion so that a plurality of spectacles magnets is mounted in the flat panel portion, and the hinge bar of the sunshade-clip corresponding to the hinge arm has a magnet panel to mount a plurality of clip magnets.

6. The assembly as set forth in claim 1, wherein each of the hinge units of the spectacles includes:
a first hinge arm taking the form of a protrusion fixed to one of the lens frames;

and a second hinge arm fixed to a rear location of the first hinge arm, the first and second hinge arms forming a multistage hinge unit, wherein a free end of the second hinge arm is hingedly connected to a hinge shaft portion, which is fixed to an end of one of the temple arms, by means of a bolt screwed through a shaft hole of the hinge shaft portion, wherein a locking magnet is inserted into the end of the temple arm in front of the hinge shaft portion, and wherein a hinge magnet is inserted into a rear location of a free end of the first hinge arm.

7. The assembly as set forth in claim 1, wherein one of the spectacles magnets is inserted into a front location of a bent hinge arm, which is fixed to one of the lens frames to be connected to one of the temple arms by means of the bolt, instead of either hinge unit, and wherein each of the hinge arm units of the sunshade-clip includes: the hinge bar directly fixed to one of the clip lens frames at a position close to an upper end of the clip lens frame to extend rearward;

the hinge shaft located at a rear end of the hinge bar;

a bent bar arm interposed between the hinge shaft and the magnet arm that vertically extends downward;

an insert fixed to a lower end of the magnet arm, the insert being divided into a pair of insert pieces to have an approximately inverted U-shaped insert groove between the insert pieces, at least one of the insert pieces being provided with the clip magnet.

8. The assembly as set forth in claim 7, wherein the hinge arm has the spectacles magnet fixed at the rear surface thereof, and wherein a pair of upper and lower clip magnets is mounted to the vertical magnet arm, which is integrally formed with a combination of the hinge bar, hinge shaft, and bar arm of the sunshade-clip, to be vertically spaced apart from each other.

9. The assembly as set forth in claim 1, wherein the spectacles further includes a nose bridge interposed between both the lens frames thereof, the nose bridge having a horizontal plate shape, and wherein, when the sunshade-clip is a rimless sunshade-clip, the sunshade-clip includes: a clip bridge to connect the molded clip lenses to each other; a flange that protrudes rearward from the clip bridge;

an elastic piece bolted to the flange; a fixture arm fixed relative to the clip bridge at a position higher than the clip bridge below the elastic piece, the fixture arm taking the form of an approximately rectangular hollow frame;

and an insert having an angled U-shaped cross section and being configured to be hingedly supported by the fixture arm, wherein the elastic piece is configured to press an upper end of the insert downward at a tip end thereof, so that the insert is elastically fixed at a pivoting position due to an angled shape thereof, in accordance with operation of the elastic piece, and wherein the angled U-shaped insert is divided into a pair of insert pieces, which are horizontally arranged to face each other, at least one of the insert pieces being provided with one of the clip magnets.

10. The assembly as set forth in claim 1, wherein, when the sunshade-clip is a rimless sunshade-clip, the sunshade-clip further includes: a clip bridge to connect molded clip lenses to each other; an upright arm that is fixed to the clip bridge and has an approximately L-shaped form;

a hinge bar connected to a free end of the upright arm;

a hinge shaft hingedly connected to the hinge bar to allow the hinge bar to pivotally rotate upward and downward by a predetermined angle;

a pivot arm extending downward from the hinge shaft; and an insert fixed to a lower end of the pivot arm.

11. The assembly as set forth in claim 10, wherein the spectacles include a plate-shaped nose bridge made of a magnetic material attracted by the clip magnet, and wherein the clip bridge of the sunshade-clip is provided with a channel insert having an approximately inverted U-shaped cross section.

12. The assembly set forth as in claim 10, wherein the clip bridge of the sunshade-clip has a slightly lowered attachment position and is provided with an approximately U-shaped upright arm, and wherein the spectacles has a fixture channel, which serves as a nose bridge interposed between both the lens frames and is downwardly fitted into the upright arm.

13. The assembly as set forth in claim 10, wherein the sunshade-clip includes a pair of an upright arm and a channel insert provided at either outer end of the sunshade-clip, and wherein each hinge unit of the spectacles, interposed between one of the lens frames and one of the temple arms, includes a fixture channel having a hollow rectangular frame shape corresponding to the channel insert of the sunshade-clip.

14. The assembly as set forth in claim 1, wherein one of the spectacles and the sunshade-clip is provided with at least one magnet, and the other one of the spectacles and the sunshade-clip is provided with at least one magnet or provided at least one specific location thereof with a magnetic material selected from among various magnetic materials attracted by the magnet.

* * * * *